Reissued Nov. 27, 1934 Re. 19,381

UNITED STATES PATENT OFFICE 19,381

ASPHALTIC CEMENT

William C. Ferguson, St. Louis, Mo.

No Drawing. Original No. 1,878,625, dated September 20, 1932, Serial No. 321,771, November 24, 1928. Application for reissue September 19, 1934, Serial No. 744,721

2 Claims. (Cl. 106—31)

This invention relates to asphaltic compositions of the kind generally referred to as asphaltic cement.

The asphaltic cements that are now in commercial use may be divided into two general classes as follows:

1st. Those that are made of heavy asphalt cut back with naphtha or some other light oil; and 2nd. Those that are made of asphalt combined with water so as to form an emulsion.

Both of the types of asphaltic cement above referred to have one inherent objectionable characteristic that greatly limits their commercial use, i. e., they require exposure to the air, in order to harden or "set". Accordingly, the asphaltic cements now on the market are not well adapted for use as a filler for large joints, or in work that requires the cement to be spread in the form of a relatively thick body on a surface or between two opposed surfaces, due to the fact that too long a period is required for the cement to set or harden, for, in the case of an asphaltic cement of the class first mentioned, it must be exposed to the air for a considerable time after it has been installed, in order that the naphtha used to cut back the heavy asphalt may gradually dissipate in the air, and in the case of an asphaltic cement of the second class above referred to, the emulsion must be exposed to the air for a considerable period, in order that the water of the emulsion will evaporate. Neither of the classes of asphaltic cement above mentioned are capable of the being used under water, due, of course to the fact that they will not harden nor set unless exposed to the air.

One object of my invention is to provide an asphaltic cement which is of such a character or nature that it will dry or set in a reasonable time when it is used as a filler for large joints or installed in the form of a relatively thick mass or body.

Another object is to provide an asphaltic cement that will set or harden under water.

To this end I have devised an asphaltic cement that is composed principally of particles of relatively hard and brittle asphalt in granular form, mixed with a binder which is of such a character or nature that the admixture of same with the granular asphaltic material will produce a mass that will remain in a plastic or semi-plastic condition long enough to enable it to be easily molded, troweled or worked into a joint, but which thereafter will set or harden, even in the absence of air, or without exposure to the air. If desired, a fibrous substance can be incorporated in the mixture above described, so as to increase its tensile strength by comingling of the fiber with the asphaltic particles of the mixture.

The asphaltic material that I prefer to use in producing my improved asphaltic cement is of the kind that is known commercially as "Gilsonite", and which, as is well known, is a relatively hard, brittle asphalt consisting substantially of pure bitumen and having a melting point above 200° F. (ball and ring method). The binder that is mixed with the asphaltic particles contains or comprises a substance or ingredient that will readily penetrate into the asphaltic particles, and which, as absorption by the asphaltic particles takes place, leaves a bonding agent on the asphaltic particles that sets or hardens, even in the absence of air. One binder that I have found to be well adapted for use in the manufacture of my improved asphaltic cement consists of a relatively soft petroleum asphalt which has been cut back to a liquid state with a liquid substance such as naphtha which will be readily absorbed by the hard asphaltic particles, and thus leave on the particles of hard asphalt the relatively soft asphalt that sets or hardens and bonds the asphaltic particles together as the absorption takes place. I wish it to be understood, however, that other binders may be used, such as contain a substance or ingredient which will readily penetrate into the asphaltic particles, and thus leave a residue or base that acts as a bonding agent for the asphaltic particles and which will co-act with same to produce a mass that will set or harden without exposure to the air. It is preferable but not absolutely essential that the asphaltic material be in the form of relatively coarse particles and relatively fine particles when said asphaltic material is mixed with the binder, for when the ingredients are mixed or combined in this manner, I obtain a mixture or compound that can be easily handled with a trowel or worked into joints, the finer particles of asphaltic material filling the voids or spaces between the coarser particles, and thus producing a plastic mass of about the consistency of mortar.

One procedure that I have found to be satisfactory for producing my improved asphaltic cement is as follows:

Mix together, in any suitable way, approximately 1 lb. of "Gilsonite" ground relatively coarse, approximately 1 lb. of "Gilsonite" ground a trifle finer, approximately ¼ of a lb. of long asbestos fiber and approximately ⅜ of a lb. of a liquid asphaltic binder of the kind above described.

An asphaltic composition of the kind above described will set or harden usually in about 48 hours, without exposure to the air and even when it is used under water, due to the fact that the oil or liquid ingredient of the binder will penetrate readily into the particles of "Gilsonite" and be absorbed by same, thus leaving a bonding agent on the particles of "Gilsonite" that sets or hardens upon the absorption of said oil or liquid ingredient by the "Gilsonite".

In preparing or producing my improved asphaltic cement it is preferable that the substance used as the binder be mixed with the granular particles of asphalt at approximately the time or shortly before the time the mixture is used, because the hardening, setting or solidification of the mixture is effected by absorption of the oil or liquid constituent of the binder by the particles of asphalt. In preparing my asphaltic cement for the market, the coarse "Gilsonite," properly proportioned and mixed with the finer "Gilsonite" and the fibrous substance, in case a fibrous substance is used, is shipped in one container, and the substance that is used as the binder is shipped in a separate container. At or shortly before the time the cement is to be used the binder is mixed in the proper proportion with the coarse and fine asphaltic material and the fibrous substance.

While I have obtained good results with a composition composed of substances of the character mentioned, mixed in approximately the proportions specified, I wish it to be understood that other substances may be used as the binder and that the percentages or proportions of the various ingredients of the mixture may be changed without departing from the spirit of my broad idea, which, briefly stated, consists of an asphaltic cement or asphaltic cement compound composed of two complemental parts or portions that are adapted to be mixed together to form a plastic or substantially plastic mass, one of said portions comprising comminuted hard asphalt having a melting point in excess of 200° F., and the other portion consisting of a binding medium composed of liquid asphalt, i. e., a mixture of an asphaltic material and a diluent, the diluent being of such a nature that it will rapidly penetrate and be absorbed by the hard asphalt, even in the absence of air, whereby the asphaltic material of the binding medium will thicken and harden upon absorption of the diluent by the hard asphalt, with the result that the entire mixture is converted into a hard mass.

Having thus described my invention, what I claim as new and desire to secure by Letters Patent is:

1. An asphaltic cement compound or mixture of troweling consistency, composed of two complemental parts which may be mixed with facility, one of said parts constituting the major portion of the mixture and comprising comminuted hard asphalt having a melting point in excess of 200° F., and the other part composed of an asphaltic substance and a diluent combined in such proportions that the diluent will penetrate and be absorbed by the hard comminuted asphalt, even in the absence of air, thus causing the mixture to set or harden.

2. An asphaltic cement compound or mixture composed of two complemental parts which may be mixed with facility, one of said parts constituting the major portion of the mixture and comprising a comminuted hard asphalt having a melting point in excess of 200° F., and the other part composed of an asphaltic substance and a diluent combined in such proportions that the diluent will penetrate and be absorbed by the hard comminuted asphalt, even in the absence of air, thus causing the mixture to set or harden.

WILLIAM C. FERGUSON.